(12) United States Patent
Karpushin et al.

(10) Patent No.: US 11,470,254 B1
(45) Date of Patent: Oct. 11, 2022

(54) SYSTEMS AND METHODS FOR ASSESSING STABILIZATION OF VIDEOS

(71) Applicant: GoPro, Inc., San Mateo, CA (US)

(72) Inventors: Maxim Karpushin, Paris (FR); Vincent Riaute, Carrieres sous Poissy (FR); Thomas Derbanne, Paris (FR)

(73) Assignee: GoPro, Inc., San Mateo, CA (US)

( * ) Notice: Subject to any disclaimer, the term of this patent is extended or adjusted under 35 U.S.C. 154(b) by 222 days.

(21) Appl. No.: 16/946,395

(22) Filed: Jun. 19, 2020

Related U.S. Application Data

(60) Provisional application No. 62/864,623, filed on Jun. 21, 2019.

(51) Int. Cl.
*H04N 5/232* (2006.01)
*G06T 7/246* (2017.01)

(52) U.S. Cl.
CPC ......... *H04N 5/23267* (2013.01); *G06T 7/246* (2017.01); *H04N 5/23254* (2013.01); *H04N 5/23258* (2013.01); *G06T 2207/10016* (2013.01)

(58) Field of Classification Search
CPC .. H04N 5/23267; H04N 5/23274; G06T 7/30; G06T 7/246; G06T 7/38
See application file for complete search history.

(56) References Cited

U.S. PATENT DOCUMENTS

| | | | |
|---|---|---|---|
| 8,531,535 B2 * | 9/2013 | Kwatra | G06T 7/246 348/208.14 |
| 8,810,666 B2 * | 8/2014 | Grundmann | H04N 5/23267 348/208.4 |
| 8,860,825 B2 * | 10/2014 | Grundmann | G06T 5/003 348/222.1 |
| 9,357,129 B1 * | 5/2016 | Grundmann | G06T 7/246 |
| 9,413,963 B2 * | 8/2016 | Beysserie | H04N 5/23267 |
| 9,554,043 B2 * | 1/2017 | Grundmann | H04N 5/23264 |
| 9,787,902 B1 * | 10/2017 | Beysserie | H04N 5/23258 |
| 10,262,691 B1 * | 4/2019 | Gilmour | H04N 5/77 |
| 10,341,564 B1 * | 7/2019 | Derbanne | H04N 5/23267 |
| 10,432,864 B1 * | 10/2019 | Douady | H04N 5/23267 |
| 10,447,928 B2 * | 10/2019 | Kawamura | G06T 5/003 |
| 10,462,370 B2 * | 10/2019 | Shi | G06T 5/50 |
| 10,536,643 B1 * | 1/2020 | Douady | H04N 5/232933 |
| 10,574,894 B2 * | 2/2020 | Derbanne | H04N 5/23267 |
| 10,587,807 B2 * | 3/2020 | Derbanne | H04N 5/23258 |
| 10,587,808 B2 * | 3/2020 | Derbanne | H04N 5/23258 |
| 10,681,332 B1 * | 6/2020 | Stimm | H04N 5/2329 |
| 10,750,092 B2 * | 8/2020 | Douady | H04N 5/23267 |
| 10,911,677 B1 * | 2/2021 | Zhou | G06T 7/70 |
| 10,958,840 B2 * | 3/2021 | Douady | H04N 5/2252 |
| 11,006,044 B1 * | 5/2021 | Jayakumar | H04N 5/23241 |
| 11,025,824 B2 * | 6/2021 | Derbanne | H04N 5/23267 |
| 11,064,118 B1 * | 7/2021 | Rahmouni | H04N 5/23258 |

(Continued)

FOREIGN PATENT DOCUMENTS

WO    WO-2020213756 A1 * 10/2020 ......... G06K 9/00744

*Primary Examiner* — John Villecco

(74) *Attorney, Agent, or Firm* — Esplin & Associates, PC

(57) ABSTRACT

A video may be captured by an image capture device in motion. A stabilization trajectory for the video may reflect stabilization rotational positions to compensate for at least some of the motion of the image capture device. The stabilization trajectory may have a stabilization trajectory length. The stabilization of the visual content may be assessed based on the stabilization trajectory length.

20 Claims, 7 Drawing Sheets

(56) References Cited

U.S. PATENT DOCUMENTS

| | | | |
|---|---|---|---|
| 11,064,119 B2* | 7/2021 | Shi | H04N 5/23254 |
| 11,172,130 B2* | 11/2021 | Douady | H04N 5/2254 |
| 11,228,712 B2* | 1/2022 | Douady | H04N 5/2253 |
| 2010/0208087 A1* | 8/2010 | Ogawa | G06T 7/20 348/208.4 |
| 2013/0121597 A1* | 5/2013 | Hsu | H04N 5/21 382/201 |
| 2013/0182134 A1* | 7/2013 | Grundmann | H04N 5/23254 348/208.6 |
| 2014/0071299 A1* | 3/2014 | Grundmann | H04N 5/23264 348/208.99 |
| 2014/0160309 A1* | 6/2014 | Karpenko | H04N 5/23267 348/208.6 |
| 2014/0327788 A1* | 11/2014 | Grundmann | H04N 5/23267 348/208.4 |
| 2015/0256755 A1* | 9/2015 | Wu | G06T 7/277 348/208.6 |
| 2016/0006935 A1* | 1/2016 | Zhou | H04N 5/23258 348/208.1 |
| 2016/0255273 A1* | 9/2016 | Wakamatsu | H04N 5/23258 348/208.99 |
| 2017/0041545 A1* | 2/2017 | Murgia | H04N 5/23258 |
| 2017/0142337 A1* | 5/2017 | Kokaram | H04N 5/23277 |
| 2017/0289454 A1* | 10/2017 | Pettersson | H04N 5/23267 |
| 2018/0007269 A1* | 1/2018 | Sclar | H04N 5/23267 |
| 2018/0048821 A1* | 2/2018 | Segapelli | H04N 5/144 |
| 2018/0220073 A1* | 8/2018 | Keal | H04N 5/23258 |
| 2019/0104255 A1* | 4/2019 | Shi | H04N 5/23254 |
| 2019/0124267 A1* | 4/2019 | Haruna | H04N 5/23261 |
| 2019/0356856 A1* | 11/2019 | Derbanne | H04N 5/23258 |
| 2019/0356857 A1* | 11/2019 | Derbanne | H04N 5/23267 |
| 2019/0379834 A1* | 12/2019 | Derbanne | H04N 5/23267 |
| 2020/0092451 A1* | 3/2020 | Douady | H04N 5/2252 |
| 2020/0092480 A1* | 3/2020 | Douady | H04N 5/2253 |
| 2020/0120252 A1* | 4/2020 | Douady | H04N 5/23258 |
| 2020/0177813 A1* | 6/2020 | Derbanne | H04N 5/23258 |
| 2020/0267320 A1* | 8/2020 | Song | H04N 5/23258 |
| 2020/0374442 A1* | 11/2020 | Douady | H04N 5/23258 |
| 2021/0289138 A1* | 9/2021 | Derbanne | H04N 5/23258 |
| 2022/0053114 A1* | 2/2022 | Douady | H04N 5/2253 |

* cited by examiner

SYSTEMS AND METHODS FOR ASSESSING STABILIZATION OF VIDEOS

FIELD

This disclosure relates to assessing stabilizations of videos.

BACKGROUND

A video may have been captured by an image capture device in motion. The motion of the image capture device during the capture of the video may cause the video to appear jerky/shaky. Different stabilizations of the video may reduce motion within the video differently. Objective assessment of video stabilization to assess comparative stabilization performance of different stabilizations is desirable.

SUMMARY

This disclosure relates to assessing stabilization of videos. Video information defining a video, stabilization information for the video, and/or other information may be obtained. The video may include video content having a progress length. The video content may include visual content captured by an image capture device during a capture duration. The image capture device may experience rotational positions as a function of progress through the capture duration. The stabilization information may characterize a stabilization trajectory for the video. The stabilization trajectory may reflect stabilization rotational positions as the function of progress through the capture duration for stabilization of the visual content. The stabilization rotational positions may compensate for at least some of the rotational positions experienced by the image capture device. The stabilization trajectory may have a stabilization trajectory length. The stabilization of the visual content may be assessed based on the stabilization trajectory length and/or other information. A change in stabilization for the visual content may be effectuated based on the assessment of the stabilization of the visual content and/or other information.

A system that assesses stabilization of videos may include one or more electronic storages, one or more processors, and/or other components. An electronic storage may store video information defining a video, information relating to the video, information relating to video content, information relating to visual content, information relating to an image capture device, information relating to a capture duration, information relating to stabilization of visual content, stabilization information, information relating to stabilization trajectory, information relating to stabilization assessment, information relating to a change in stabilization, and/or other information.

The processor(s) may be configured by machine-readable instructions. Executing the machine-readable instructions may cause the processor(s) to facilitate assessing stabilization of videos. The machine-readable instructions may include one or more computer program components. The computer program components may include one or more of a video information component, a stabilization information component, a stabilization assessment component, a change component, a comparison component, and/or other computer program components.

The video information component may be configured to obtain video information and/or other information. Video information may define a video. The video may include video content having a progress length. The video content may include visual content captured by an image capture device during a capture duration. The image capture device may experience rotational positions as a function of progress through the capture duration.

The stabilization information component may be configured to obtain stabilization information for the video and/or other information. The stabilization information may characterize one or more stabilization trajectories for the video. A stabilization trajectory may reflect stabilization rotational positions as the function of progress through the capture duration for stabilization of the visual content. The stabilization rotational positions may compensate for at least some of the rotational positions experienced by the image capture device. The stabilization trajectory may have a stabilization trajectory length. For example, the stabilization information component may obtain first stabilization information for the video. The first stabilization information may characterize a first stabilization trajectory having a first stabilization trajectory length for the video. The first stabilization trajectory may reflect first stabilization rotational positions as the function of progress through the capture duration for first stabilization of the visual content The stabilization assessment component may be configured to assess stabilization of the visual content based on a stabilization trajectory length and/or other information. For example, the stabilization assessment component may assess the first stabilization of the visual content based on the first stabilization trajectory length and/or other information.

The change component may be configured to effectuate one or more changes in stabilization for the visual content based on assessment of one or more stabilizations of the visual content and/or other information. In some implementations, a change in stabilization for the visual content may include a change in one or more stabilization parameters. In some implementations, a change in stabilization for the visual content may include a change in one or more stabilization techniques used to stabilize the visual content.

The comparison component may be configured to provide one or more comparisons of assessment of different stabilizations of the visual content. For example, the comparison component may provide a comparison of the assessment of the first stabilization of the visual content with an assessment of a second stabilization of the visual content and/or assessment(s) of other stabilization(s) of the visual content.

In some implementations, the assessment of the second stabilization of the visual content may be performed based on a second stabilization trajectory length of a second stabilization trajectory for the video and/or other information. The second stabilization trajectory may reflect second stabilization rotational positions as the function of progress through the capture duration for the second stabilization of the visual content. At least some of the second stabilization rotational positions of the second stabilization trajectory may be different from corresponding first stabilization rotational positions of the first stabilization trajectory.

In some implementations, the first stabilization trajectory may be determined based on a first stabilization technique and the second stabilization trajectory may be determined based on a second stabilization technique different from the first stabilization technique.

In some implementations, the first stabilization trajectory may be determined based on a first set of stabilization parameters for a stabilization technique and the second stabilization trajectory may be determined based on a second set of stabilization parameters for the stabilization technique. The first set of stabilization parameters may be different from the second set of stabilization parameters.

In some implementations, the first set of stabilization parameters being different from the second set of stabilization parameters may include one or more values of the first set of stabilization parameters being different from one or more corresponding values of the second set of stabilization parameters. In some implementations, the first set of stabilization parameters being different from the second set of stabilization parameters may include the first set of stabilization parameters including one or more stabilization parameters not included in the second set of stabilization parameters.

In some implementations, the first set of stabilization parameters being different from the second set of stabilization parameters may include the first set of stabilization parameters defining a first viewing window and the second set of stabilization parameters defining a second viewing window different from the first viewing window. The first viewing window may define a first extent of the visual content included within a first punchout and the second viewing window may define a second extent of the visual content included within a second punchout. The first viewing window being different from the second viewing window may include the first viewing window and the second viewing window having different sizes and/or shapes.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
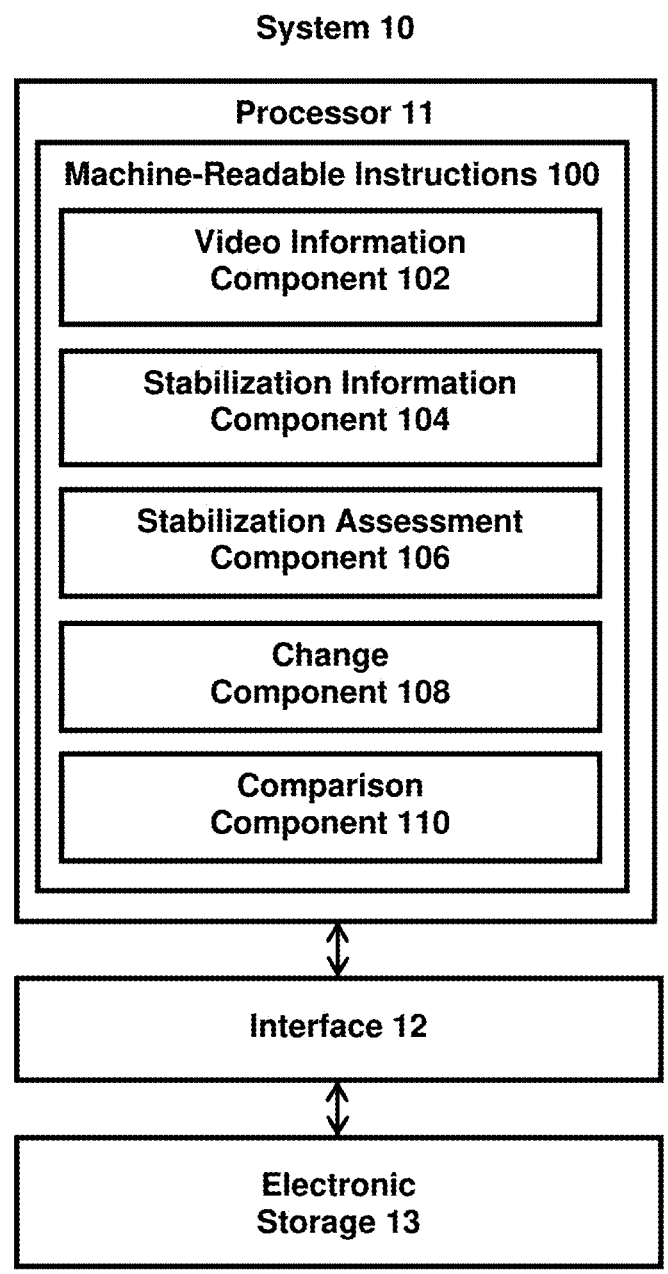
FIG. 1 illustrates an example system that assesses stabilization of videos.

FIG. 1 illustrates a system 10 for assessing stabilization of videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information defining a video, stabilization information for the video, and/or other information may be obtained by the processor 11. The video may include video content having a progress length. The video content may include visual content captured by an image capture device during a capture duration. The image capture device may experience rotational positions (orientations) as a function of progress through the capture duration. The stabilization information may characterize a stabilization trajectory for the video. The stabilization trajectory may reflect stabilization rotational positions as the function of progress through the capture duration for stabilization of the visual content. The stabilization rotational positions may compensate for at least some of the rotational positions experienced by the image capture device. The stabilization trajectory may have a stabilization trajectory length. The stabilization of the visual content may be assessed based on the stabilization trajectory length and/or other information. A change in stabilization for the visual content may be effectuated based on the assessment of the stabilization of the visual content and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining a video, information relating to the video, information relating to video content, information relating to visual content, information relating to an image capture device, information relating to a capture duration, information relating to stabilization of visual content, stabilization information, information relating to stabilization trajectory, information relating to stabilization assessment, information relating to a change in stabilization, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate assessing stabilization of videos. The machine-readable instructions 100 may include one or more computer program components. The machine-readable instructions 100 may include one or more of a video information component 102, a stabilization information component 104, a stabilization assessment component 106, a change component 108, a comparison component 110, and/or other computer program components.

Visual content (of image(s), of video frame(s), of video(s)) with a field of view may be captured by an image capture device during a capture duration. Visual content may refer to content of image(s), video frame(s), and/or video(s) that may be consumed visually. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
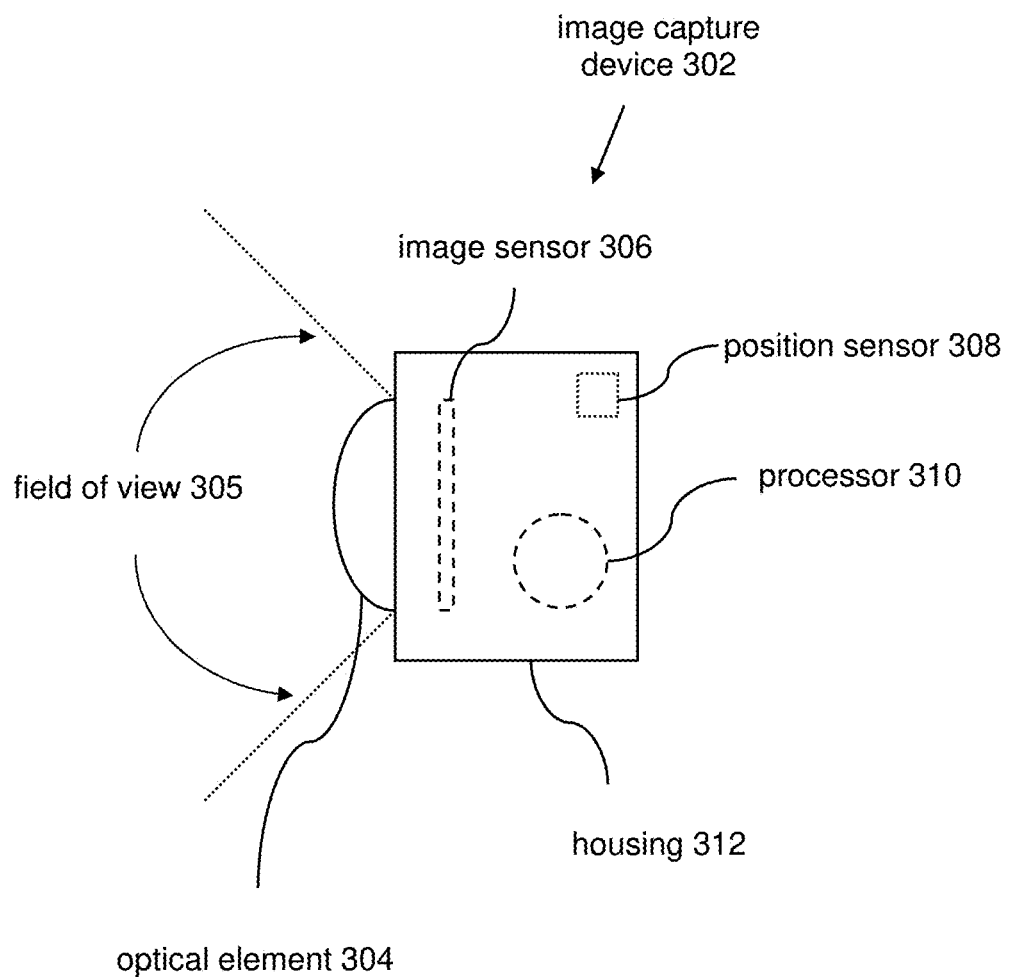
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone, tablet). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. In some implementations, an image capture device may include multiple optical elements and/or multiple image sensors. The combined field of view of the optical elements may include a spherical field of view. The multiple optical elements and/or multiple image sensors may be used to capture spherical visual content. Spherical visual content may include a spherical field of view. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 as the function of progress through the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. In some implementations, the position information may characterize translational and/or rotational positions of the image capture device 302 by characterizing changes in translational and/or rotational positions (motion) of the image capture device 302 during the capture duration, and vice versa.

In some implementations, the position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the image capture device 302 may be computationally expensive in terms of processing power, processing time, and/or battery consumption. Using the information/signals from the position sensor 308 to determine positions/motions of image capture device 302 may be computationally cheaper. That is, less processing power, processing time, and/or battery consumption may be required when positions/motions of the image capture device 302 are determined from the information/signals from the position sensor 308 than the information/signals from the image sensor 306. The position information determined independent of the visual information may be used to determine the positions of the image capture device 302 during the capture duration.

In some implementations, the position information may be determined based on the visual content and/or other information/signals from the image sensor 306. For example, optical flow and/or other pixel characteristic analysis may be performed to estimate the positions of the image capture device 302 as the function of progress through the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The image capture device 302 may experience motion during the capture duration. Motion of the image capture device 302 may include the image capture device experiencing different positions (e.g., translational positions, rotational positions) during the capture duration. That is, the image capture device 302 may capture visual content while changing positions during the capture duration. The image capture device 302 may experience positions (e.g., translational positions, rotational positions) as a function of progress through the capture duration. Different positions of the image capture device 302 at which the visual content is captured may correspond to different moments within the progress length of the visual content.

Motion of the image capture device 302 during visual content capture may result in motion within the visual content. For example, shaking of the image capture device 302 during visual content capture may result in shaky motion within the captured visual content. Such motion within the visual content may be unintentional and/or not be desirable. Stabilization of visual content may include reduction/removal of motion present in the visual content due to motion (e.g., mechanical displacement, rotational motion, translational motion) of the image capture device 302 during visual content capture.

In some implementations, the visual content may be stabilized via one or more punchouts of the visual content and/or other information. Such stabilization of visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. A punchout of the visual content may include extents of the visual content within one or more viewing windows. The extents of the visual content viewable/extracted within the viewing window may be used to provide views of different spatial extents of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length/capture duration of the visual content. A viewing window may correspond to the entire duration of the progress length/capture duration or for one or more portions (e.g., portions including moments of interest) of the progress length/capture duration. The punchout of the visual content may be presented on one or more displays, included in one or more videos, and/or otherwise used to stabilize the visual content.

Stabilization of visual content may be performed based on placement of the viewing window within the field of view of the visual content. The placement of the viewing window may compensate for the positions/motion of the image capture device during the capture duration. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame). The viewing window may be oriented with respect to the field of view of the visual content based on movement of the viewing window and/or movement of the field of view (e.g., movement of visual content in image space).

Figure 4A:
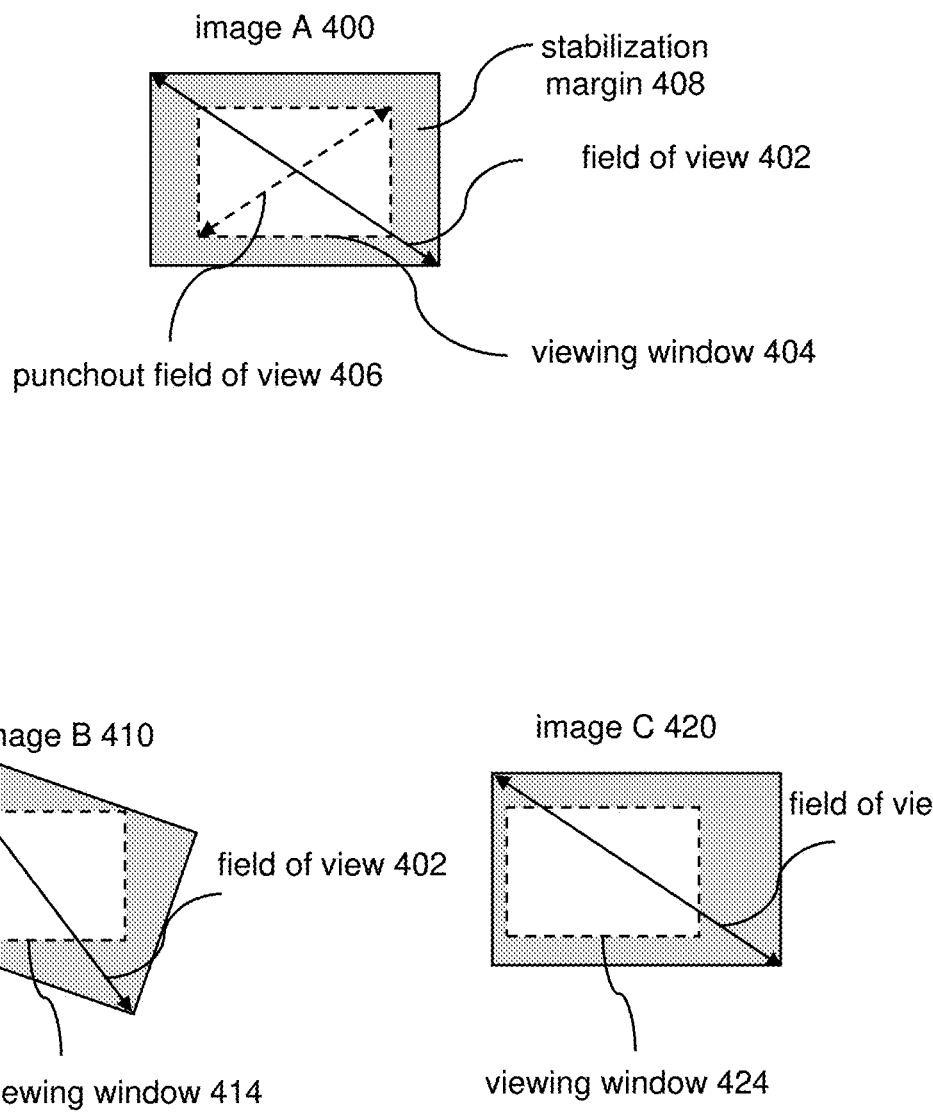
FIG. 4A illustrates example orientations of viewing windows with respect to images.

For example, FIG. 4A illustrates example orientations of viewing windows 404, 414, 424 with respect to images 400, 410, 420. The images 400, 410, 420 may have a field of view 402. The viewing windows 404, 414, 424 may have a punchout field of view 406. The images 400, 410, 420 may include capture of a scene within an angle defined by the field of view 402. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a stabilization margin 408 within which the viewing window 404 may move with respect to the image A 400/field of view 402. The stabilization margin 408 may specify how much the viewing window 404 may move while remaining inside the field of view 402 of the visual content included within the image A 402 (e.g., crop constraint).

The viewing window 404, 414, 424 may be placed within the field of view 402 to perform video stabilization. For example, the viewing window 414 may be rotated with respect to the field of view 402 of the image B 410 while not going beyond the pixels captured within the image B 410. The viewing window 424 may be laterally moved with respect to the field of view 402 of the image C 420 while not going beyond the pixels captured within the image C 420. The placements of the viewing window 404, 414, 424 may be determined based on the positions/motions of the image capture device when the images 400, 410, 420 were captured to stabilize the visual content.

For instance, the viewing window 414 may be oriented with respect to the field of view 402 of the image B 410 to provide a punchout of the image B 410 that is stable with respect to a prior and/or next punchout of the images (e.g., stable with the punchout of the image A 400 using the viewing window 404 for the image A 400). Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

In some implementations, placement of the viewing window within the field of view of the visual content may be determined based on positions (e.g., rotational positions, translational positions) of the image capture device during the capture duration, stabilization applied to the visual content, and/or other information. The punchout of the visual content may include one or more spatial extents of the visual content as a function of progress through the progress length of the visual content to compensate for different positions (translational positions and/or rotational positions) of the image capture device during the corresponding moments within the capture duration. Different stabilization applied to the visual content may result in different placements of the viewing window (e.g., different crop motion) being determined to compensate for the positions of the image capture device during the capture duration.

For example, one or more portions of the visual content captured from light within the field of view 305 may be presented on a display and/or used to present/generate stabilized visual content. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not include or includes less motion than the visual content. The field of view 305 may be larger than a size of the punchout/viewing window used to generate stabilized visual content.

For instance, the visual content may include shaky/jerky footage due to motion of the image capture device 302 during visual content capture, and the viewing window may be determined so that the portion of the visual content that is presented/used for video generation does not appear shaky/jerky or appears less shaky/jerky. That is, a punchout/viewing window may be used to stabilize visual content captured by the image capture device 302. For example, the shape, size, and/or the location of the viewing window within the field of view of the visual content may be determined to compensate for motion of the image capture device 302 during capture such that the video appears to have been captured from an image capture device 302 with less motion. The visual content captured by the image capture device 302 may be cropped to generate stabilized visual content.

A viewing window may define one or more extents of the visual content. A viewing window may define extents of the visual content to be included within stabilized visual content as the function of progress through the progress length of the visual content. A viewing window may define which portions of the visual content are included within the stabilized visual content at different moment within the progress length. Inclusion of the extents of the visual content defined by the viewing window within the stabilized visual content may effectuate stabilization of the visual content. For example, a viewing window may define which spatial portions of the visual content captured by the image capture device during the capture duration is presented on a display and/or included within stabilized visual content. Stabilized visual content may be generated as outputs of portions of the visual content captured by the image capture device, with the outputted portions including extent(s) of the visual content within the punchout/viewing window. Inclusion of the extent(s) of the visual content within the punchout/viewing window may effectuate stabilization of the visual content via selective cropping.

A viewing window may be located within the field of view of the visual content. Placement of the viewing window within the field of view of the visual content may be determined based on positions (e.g., rational positions, translational positions, changes in positions) of the image capture device during the capture duration, stabilization (stabilization technique) applied to the visual content, and/or other information. For example, the placement of the viewing window within the field of view of the visual content may change as a function of progress through the progress length of the visual content based on rotational positions of the image capture device, changes in rotational positions (motion) of the image capture device at different moments within the capture duration (as a function of progress through the capture duration), and/or particular stabilization technique (e.g., stabilization algorithm) applied to compensate for the rotational positions/motions of the image capture device. A viewing window may be characterized by viewing directions, viewing sizes (e.g., viewing zoom, viewing magnification), viewing rotations, and/or other information. Determining the placement of the viewing window may include determining one or more of viewing directions, viewing sizes, viewing rotations, and/or other characteristics of the viewing window.

A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content. For example, a viewing direction may be defined based on rotation about an axis that defines lateral movement of the viewing window (e.g., yaw), rotation about an axis that defines vertical movement of the viewing window (e.g., pitch), and/or rotation about other axes. The yaw and pitch values of the viewing direction may determine the location of the viewing window within captured images/video frames.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio).

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content.

In some implementations, the visual content may be stabilized via one or more modifications of the visual content and/or other information. Such stabilization of the visual content may include changes to the visual content itself (and/or creating a modified version/copy of the visual content) to provide stabilized visual content that is more stable than the original visual content. Modification of the visual content may include one or more changes to visual characteristics of the visual content, such as one or more changes in pixel locations and/or pixel intensities. Modification of the visual content may include one or more of rotation of the visual content, warping of the visual content, and/or other modification of the visual content. Rotation of the visual content may include change in how the visual content is oriented. The visual content may be rotated to compensate for different rotational positions of the image capture device during the capture duration. Warping of the visual content may include visual manipulation of one or more portions of the visual content. Visual content may be warped to compensate for different perspectives captured within the visual content due to motion of the image capture device during the capture duration. Visual content may be warped to provide rolling shutter compensation.

Figure 4B:
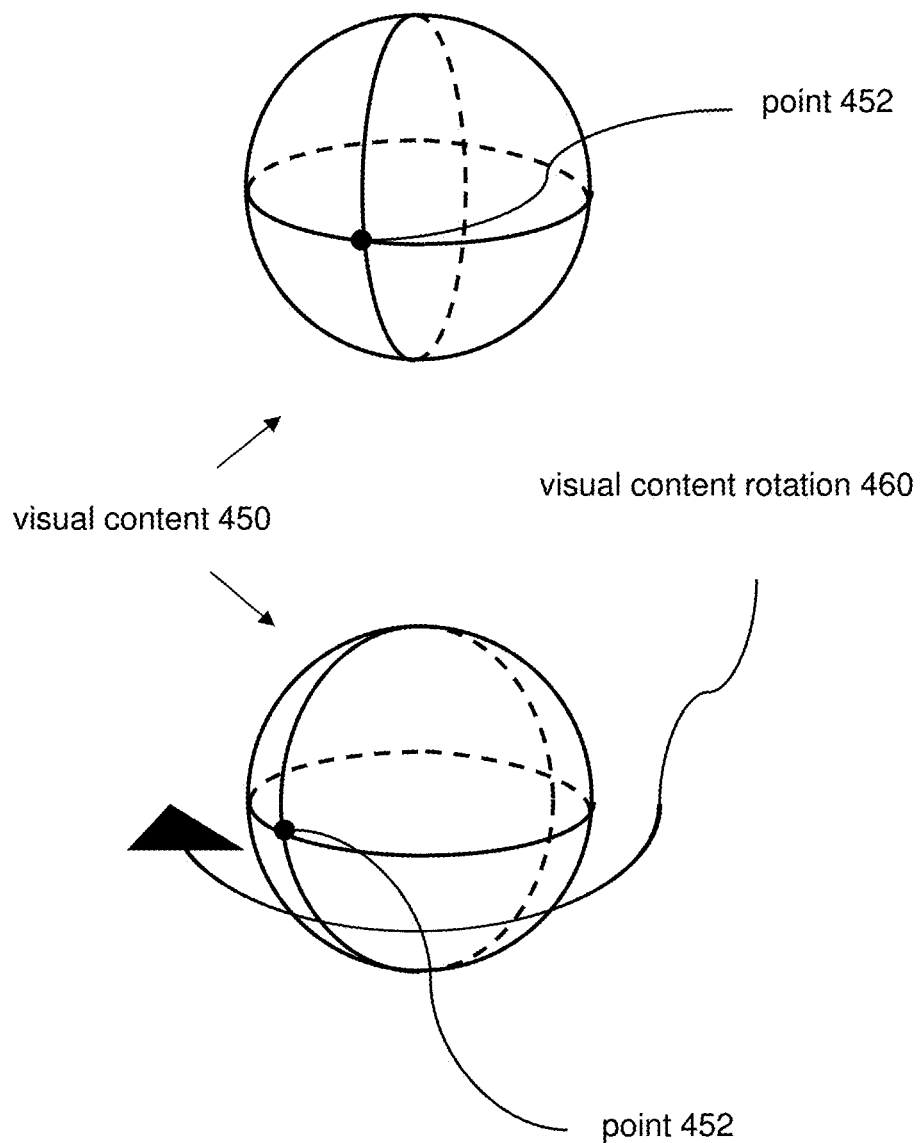
FIG. 4B illustrates example rotation of visual content.

FIG. 4B illustrates example rotation of visual content 450. The visual content 450 may include a wide-angle visual content, such as spherical visual content. Spherical visual content may include full spherical visual content (360 degrees of capture) or partial spherical visual content (less than 360 degrees of capture). Partial spherical visual content may be referred to as panoramic visual content. During capture of the visual content 450, the image capture device may have experienced motion. For example, the image capture device may have rotated. To compensate for the rotation of the image capture device during capture duration, the visual content 450 may be rotated to the right, as shown by visual content rotation 460. The visual content rotation 460 may cause a point 452 within the visual content 450 to be moved to the right. The rotation of the visual content 450 may compensate for changes in rotational positions of the image capture device during the capture duration. The rotation of the visual content 450 may inverse some or all of the motion of the image capture device during the capture duration. For example, the image capture device may move by certain amounts about the yaw, pitch, and/or roll axes, and the visual content 450 may be rotated in the corresponding direction so that the visual content appears to have been captured by a still (e.g., not rotating) image capture device.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

Referring back to FIG. 1, the processor 11 (or one or more components of the processor 11) may be configured to obtain information to facilitate assessing stabilization of videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more hardware components (e.g., an image sensor) and/or one or more software components (e.g., software running on a computing device).

Video information may define a video. The video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select one or more videos that are to be stabilized and/or played. The video information defining the video may be obtained based on the user's selection of the video content through the user interface/application. Other selections of video for retrieval of video information are contemplated.

The video may include video content having a progress length. The video content may include visual content captured by an image capture device during a capture duration. The progress length of the video content may correspond to the capture duration for the video. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content).

The video content may include visual content of one or more scenes captured by an image capture device during the capture duration. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects). The video content may include visual content captured at different moments within the capture duration. The visual content may be viewable as a function of progress through the progress length. The visual content may have a field of view, such as the field of view 305 shown in FIG. 3. The visual content may include motion due to motion of the image capture device during the capture duration. The image capture device may experience positions (e.g., translational positions, rotational positions) as a function of progress through the capture duration. Different positions of the image capture device during the capture duration may result in motion within the visual content.

The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames). Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The stabilization information component 104 may be configured to obtain stabilization information for the video and/or other information. The stabilization information may characterize one or more stabilization trajectories for the video. A stabilization trajectory may refer to one or more paths and/or progression of stabilization positions to be used in stabilization of the visual content. A stabilization trajectory may reflect stabilization positions as the function of progress through the capture duration for stabilization of the visual content. Stabilization positions (stabilization rotation positions, stabilization translational positions) may indicate, reflect, and/or define offsets in positions of the image capture device during capture duration to compensate for some or all of the positions of the image capture device. Stabilization positions may indicate, reflect, and/or define offsets in observed trajectory of the image capture device to generate one or more stabilized trajectories. Stabilization positions may indicate, reflect, and/or define how the visual content is to be stabilized as a function of gross through the capture duration/progress length.

For example, stabilization positions may provide information from which punchout/viewing window placement and/or visual content modification is determined. For instance, stabilization positions may provide information on direction and/or amount by which a viewing window deviates from the center of the field of view of the visual content and/or direction and/or amount by which the visual content is rotated. The stabilization positions may compensate for at least some of the positions experienced by the image capture device during the capture duration.

An observed trajectory may refer to one or more paths and/or progression of positions followed/experienced by the image capture device during the capture duration. An observed trajectory may reflect positions of the image capture device at different moments within the capture duration. The positions of the image capture device may include rotational positions (e.g., rotations about one or more axis of the image capture device) and/or translational positions of the image capture device. An observed trajectory of the image capture device during the capture duration may be determined based on the position information characterizing specific translational and/or rotational positions of the image capture device and/or changes in translational and/or rotational positions of the image capture device as a function of progress through the capture duration, and/or other information.

A stabilized trajectory may be generated based on stabilization of the observed trajectory and/or other information. A stabilized trajectory may refer to one or more paths and/or progression of (stabilized) positions from which punchout/viewing placement and/or visual content rotation may be determined. The path(s) and/or progression of stabilized position(s) may be used in determining which portions of the visual content (punchouts) are included in stabilized visual content and/or how (e.g., in what direction and by what amount) the visual content is to be rotated. The placement of the viewing window within the visual content (e.g., the orientation of the viewing window with respect to the field of view of the visual content) and/or rotation of the visual content may be determined based on the stabilized trajectory. The placement of the viewing window with respect to the field of view of the visual content captured at a moment may be determined based on the corresponding stabilized position (rotational position, translational position) within the stabilized trajectory at that moment and/or other information. The rotation of the visual content captured at a moment may be determined based on the corresponding stabilized position (rotational position, translational position) within the stabilized trajectory at that moment and/or other information.

A stabilized trajectory may reflect stabilized positions of a (virtual) image capture device at different moments within the capture duration. A stabilized positions may reflect actual and/or virtual positions of the image capture device at different moments within the capture duration. An actual position may refer to a position that was taken by the image capture device during visual content capture. A virtual position may refer to a position that was not taken by the image capture device during visual content capture. A virtual position may be offset (rotationally and/or translationally) from the actual position of the image capture device.

A stabilized trajectory may have smoother changes in the positions (rotational positions, translational positions) of the image capture device than the observed trajectory. A stabilized trajectory may have less jitters (slight irregular movement/variation), less abrupt changes, and/or less discontinuous changes in the positions (rotational positions, translational positions) of the image capture device than the observed trajectory. The stabilized trajectory having smoother changes in positions than the observed trajectory may include high frequency changes in the positions (rotational positions, translational positions) of the image capture device in the observed trajectory being removed from the stabilized trajectory. That is, the stabilized trajectory may not include and/or may have fewer high frequencies changes in rotational and/or translational positions of the image capture device than the observed trajectory.

The stabilization of the observed trajectory into one or more stabilized trajectories may be performed based on one or more stabilization trajectories and/or other information. The difference between an observed trajectory and a stabilized trajectory may be indicated, reflected, and/or defined by one or more one or more stabilization trajectories. Different stabilization of the visual content may result in different stabilization trajectory and/or different stabilized trajectories. Different stabilization of the visual content may include application of different stabilization techniques (e.g., stabilization algorithms) to the visual content, use of the same stabilization technique with different stabilization parameters to the visual content, and/or other different stabilization of the visual content.

A stabilization trajectory may have a stabilization trajectory length. The stabilization trajectory length may refer to a measurement or an extent of the stabilization trajectory length from one end to another (from beginning to end of the progress length/capture duration). Different stabilization of the visual content may result in different stabilization trajectory lengths. Different stabilization trajectory lengths may indicate or reflect different stabilization of the visual content. For example, stabilization of visual content with shorter stabilization trajectory length may include smaller and/or fewer differences between the observed trajectory and the stabilized trajectory while stabilization of visual content with longer stabilization trajectory length may include larger and/or more differences between the observed trajectory and the stabilized trajectory. In some implementations, shorter stabilization trajectory lengths may correspond to better attenuation of motion within the visual content (better stabilization performance) by the corresponding stabilization. For example, shorter stabilization trajectory may indicate smaller amount/fewer number of motion of the punchout/viewing window and/or smaller amount/fewer number of rotation of the visual content and longer stabilization trajectory may indicate larger amount/more number of motion of the punchout/viewing window and/or larger amount/more number of rotation of the visual content. Higher stabilization performance may correspond to smaller amount/fewer number of motion of the punchout/viewing window, or vice versa.

For example, the stabilization information component 104 may be configured to obtain different stabilization information for the video. Different stabilization information may characterize different stabilization trajectories for the video, which may provide different stabilization of the video. For example, the stabilization information component 104 may obtain first stabilization information, second stabilization information, and/or other stabilization information for the video. The first stabilization information may characterize a first stabilization trajectory having a first stabilization trajectory length for the video and the second stabilization information may characterize a second stabilization trajectory having a second stabilization trajectory length for the video. The first stabilization trajectory may reflect first stabilization rotational positions as the function of progress through the capture duration for first stabilization of the visual content. The second stabilization trajectory may reflect second stabilization rotational positions as the function of progress through the capture duration for second stabilization of the visual content. The first stabilization of the visual content may be different from the second stabilization of the visual content based on the first stabilization trajectory being different from the second stabilization trajectory. The difference between the first and second stabilization trajectories may include a difference in the first stabilization trajectory length and the second stabilization trajectory length of the stabilization trajectories.

Figure 5:
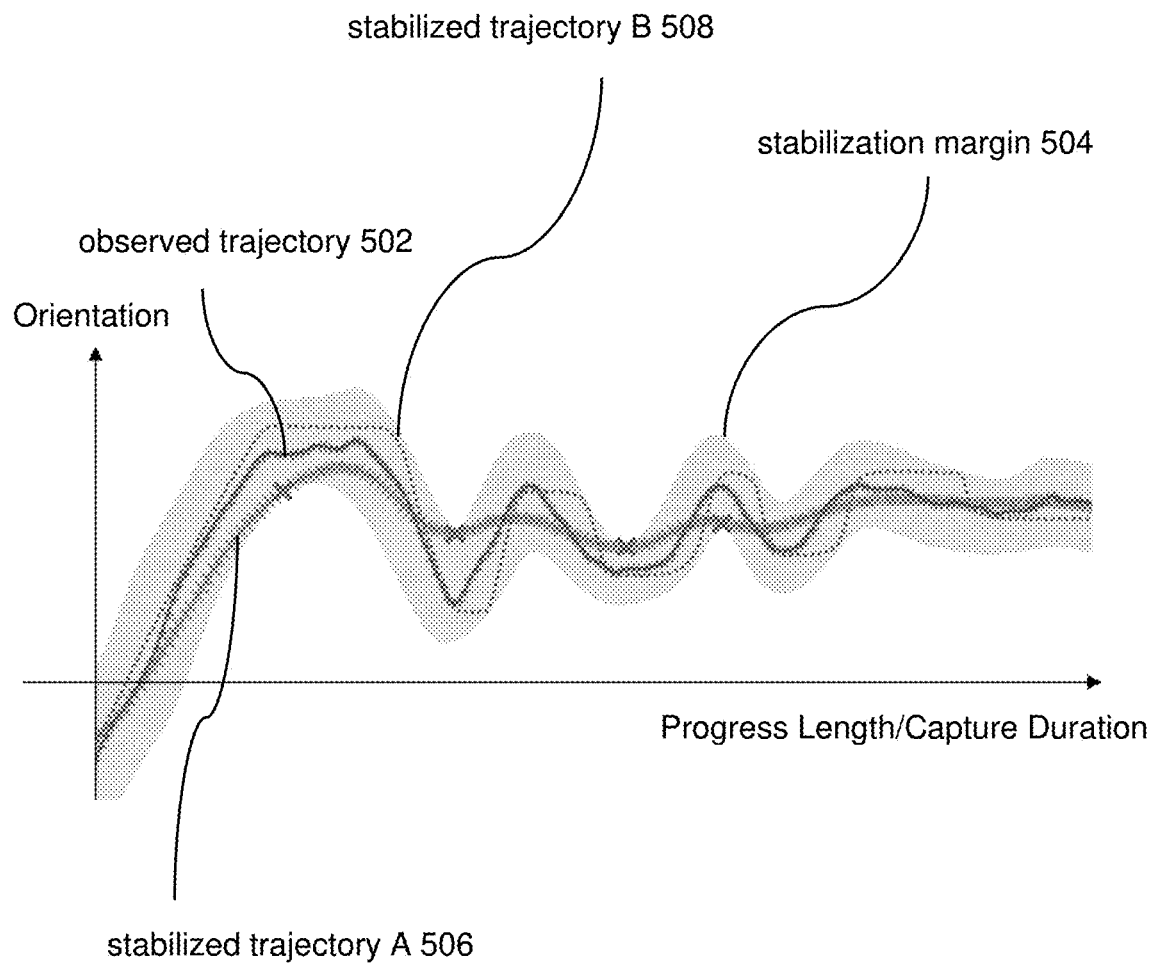
FIG. 5 illustrates example observed trajectory, stabilization margin, and stabilized trajectories.

FIG. 5 illustrates example observed trajectory 502, stabilization margin 504, stabilized trajectory A 506, and stabilized trajectory B 508. For example, the observed trajectory 502 may reflect yaw orientation (e.g., yaw rotational position) of the image capture device with respect to a yaw axis of the image capture device. The observed trajectory 502 may be determined from position information generated by one or more positions sensors (e.g., gyroscope data) and/or position information determine based on visual content (e.g., optical flow analysis). Other types of trajectory (e.g., pitch trajectory, roll trajectory, translational trajectory) are contemplated.

Generating a video including visual content (e.g., of image(s), of video frame(s), of video(s)) captured along the observed trajectory 502 may be undesirable. For example, generating a video by outputting the images captured along the observed trajectory 502 may result in a video with footage that is shaky and/or that appears to include unintended camera motion. For instance, sharp/quick changes in the yaw angle positions of the image capture device may result in abrupt changes in the direction of visuals within the video (e.g., quick left or right camera motion). Sharp/quick changes in the yaw angle positions of the image capture device may result in a shaky footage.

The observed trajectory 502 may be stabilized to generate the stabilized trajectory A 506 and the stabilized trajectory B 508. The stabilization margin 504 may indicate the amount of stabilization margin available within the field of view of the visual content for placement of the viewing window/punchout. The stabilized trajectories 506, 508 may be generated through use of different stabilization techniques, different stabilization parameters, and/or other information. The stabilized positions of the stabilized trajectories 506, 508 may be used to stabilize the visual content (e.g., determine placement of the viewing window/punchout, determine rotation of the visual content). For example, the stabilized positions of the stabilized trajectories 506, 508 may be used to determine how the viewing window should be oriented with respect to the field of view of the visual content (e.g., how the punchouts for the visual content may be laterally, vertically, and/or rotationally positioned with respect to the field of view of the visual content) and/or how the visual content should be rotated to stabilize the visual content.

High frequency changes in the observed trajectory 502 may not be included in the stabilized trajectories 506, 508. Once high frequency changes are removed from the stabilized trajectories 506, 508, it may be difficult to objectively quantify the remaining smooth motion in the stabilized trajectories 506, 508. In particular, equally noted motions may be perceived differently. That is, low frequency changes in the stabilized trajectories 506, 508 may not be equally visually pleasant. For example, the stabilized trajectory B 508 may include sharper turns (e.g., changes in direction of view) than the stabilized trajectory A 506. However, residual shakiness/changes in the stabilized trajectories 506, 508 may not provide objective assessment of stabilization performance of different stabilizations. For example, the average residual shakiness/changes in the stabilized trajectories 506,

508 may be similar, while the visual impression of the visual content stabilized using the stabilized trajectories 506, 508 may differ significantly.

Figure 6:
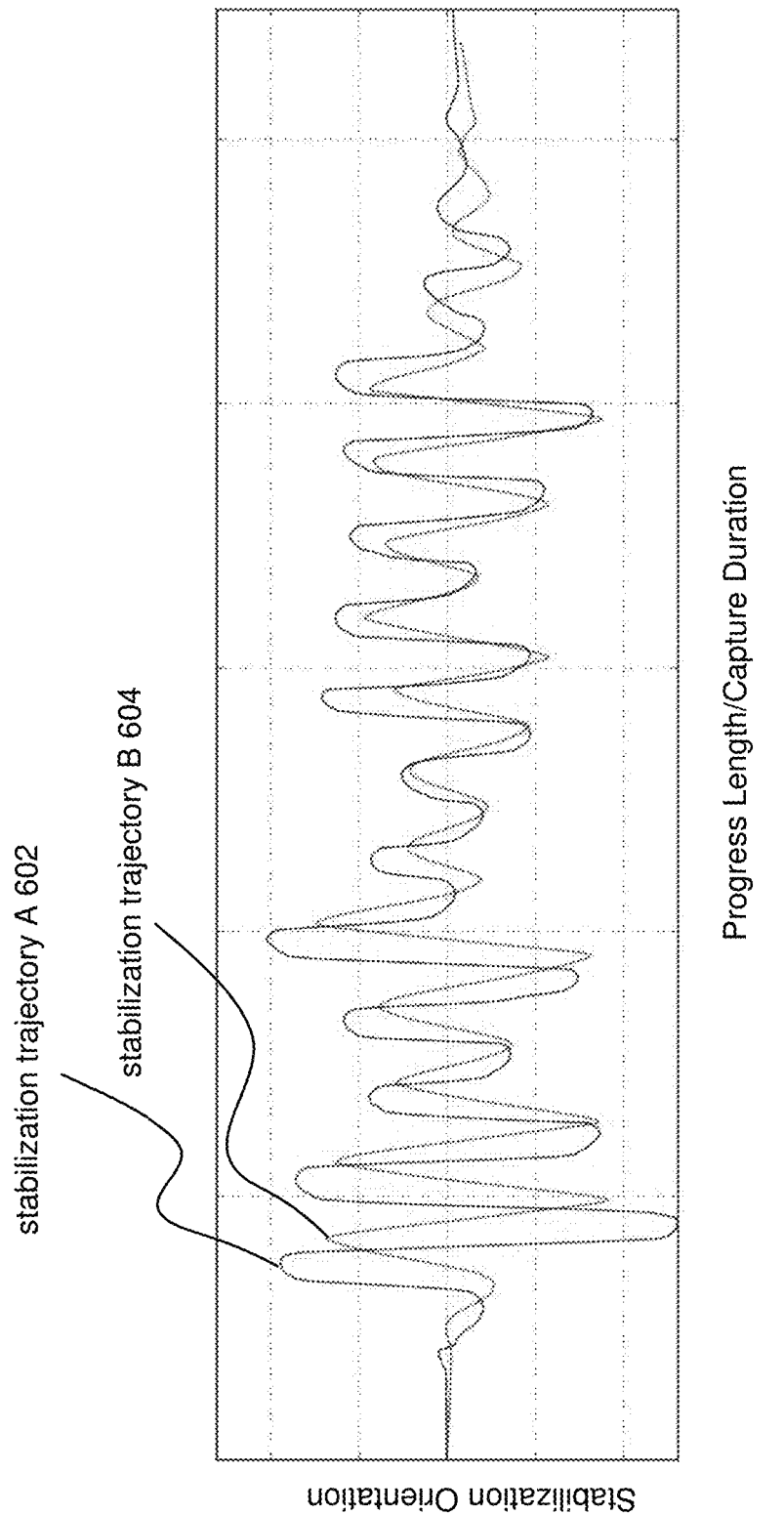
FIG. 6 illustrates example stabilization trajectories.

FIG. 6 illustrates example stabilization trajectories 602, 604. The stabilization trajectories 602, 604 may correspond to different stabilizations of same visual content. The stabilization trajectories 602, 604 may define stabilization positions as a function of progress through the progress length/capture duration of the visual content. The stabilization trajectories 602, 604 may define offsets in observed trajectory of the image capture device to generate one or more stabilized trajectories (e.g., stabilized trajectories 506, 508). Different stabilizations corresponding to the stabilization trajectories 602, 604 may include application of different stabilization techniques to the visual content, application of same stabilization technique with different stabilization parameters to the visual content, and/or other different stabilization of the visual content. For example, based on difference in stabilization technique/stabilization parameters applied to the visual content, different stabilization trajectories 602, 604 may be generated. Different stabilization of the visual content may result in different characteristics (e.g., stabilization trajectory lengths) for the stabilization trajectories 602, 604.

In some implementations, different stabilization trajectories may be determined based on use of different stabilization techniques. For example, the stabilization trajectory A 602 may be determined based on use of one stabilization technique and the stabilization trajectory B 604 may be determined based on use of a different stabilization technique.

In some implementations, different stabilization trajectories may be determined based on use of different stabilization parameters for the same stabilization technique. For example, the stabilization trajectory A 602 may be determined based on one set of stabilization parameters for a stabilization technique and the stabilization trajectory B 604 may be determined based on a different set of stabilization parameters for the stabilization technique.

In some implementations, the sets of stabilization parameters being different from each other may include one or more values of one set of stabilization parameters being different from one or more corresponding values of another set of stabilization parameters. For example, different sets of stabilization parameters may define different sizes of viewing windows for stabilization. For instance, one set of stabilization parameters may define a first viewing window and another set of stabilization parameters may define a second viewing window different from the first viewing window. The first viewing window may define a first extent of the visual content included within a first punchout of the visual content. The second viewing window may define a second extent of the visual content included within a second punchout of the visual content. The first viewing window being different from the second viewing window may include the first viewing window and the second viewing window having different sizes and/or shapes. Other differences in values of stabilization parameters are contemplated.

In some implementations, the sets of stabilization parameters being different from each other may include one set of stabilization parameters including one or more stabilization parameters not included in another set of stabilization parameters. For example, one set of stabilization parameters may define one or more constraints on maximum rotation (e.g., rotational direction, rotational speed, rotational acceleration) of the visual content permitted for stabilization while another set of stabilization parameters may not define any constraint on maximum rotation of the visual content permitted for stabilization.

The stabilization assessment component 106 may be configured to assess stabilization of the visual content based on a stabilization trajectory and/or other information. Assessing stabilization of the visual content may include one or more of analyzing, calculating, determining, estimating, evaluating, examining, identifying, retrieving, reviewing, and/or otherwise assessing the stabilization of the visual content. Assessment of the stabilization of the visual content may include qualitative and/or quantitative assessment of the stabilization of the visual content. For example, the stabilization assessment component 104 may evaluate and/or estimate the nature of, quality of, and/or quantity reflecting the stabilization of the visual content.

Stabilization of the visual content may be assessed based on one or more characteristics of the corresponding stabilization trajector(ies). That is, stabilization of the visual content may be assessed based on characteristic(s) of the stabilization trajector(ies) used to stabilize the visual content. A characteristic of a stabilization trajectory may refer to a feature and/or a quality of the stabilization trajectory. A characteristic of a stabilization trajectory may relate to one or more of length, amplitude (e.g., maximum amplitude, minimum amplitude, amplitude range), changes in amplitude, and/or other features/qualities of the stabilization trajectory.

For example, the stabilization assessment component 106 may be configured to assess stabilization of the visual content based on a stabilization trajectory length of a stabilization trajectory used to stabilize the visual content, and/or other information. For example, the stabilization assessment component may assess the first stabilization of the visual content based on the first stabilization trajectory length of the first stabilization trajectory and assess the second stabilization of the visual content based on the second stabilization trajectory length of the second stabilization trajectory and/or other information. Use of other characteristic(s) of the stabilization trajectory to assess stabilization of the visual content are contemplated.

Assessment of stabilization of visual content based on a stabilization trajectory may provide an objective assessment of the visual content stabilization. Assessment of stabilization of visual content based on a stabilization trajectory may enable objective comparison of different stabilization performance. For example, different stabilizations of visual content performed using different stabilization techniques and/or same stabilization technique with different stabilization parameters may be objectively compared using the stabilization trajectory-based assessment of visual content stabilization. Assessment of the visual content stabilization using the stabilization trajectory may enable benchmark/comparison of different stabilizations and/or analysis (e.g., non-regression analysis) of different stabilization parameters for stabilization techniques (e.g., during prototyping, integrating, and/or setting up visual content stabilization). Assessment of the visual content stabilization using the stabilization trajectory may enable benchmark/comparison of stabilization used for different visual content capture scenarios (e.g., comparison of how a stabilize technique performed for visual content captured while walking versus running versus flying).

In some implementations, assessment of stabilization of visual content based on a stabilization trajectory may provide information on how much the stabilized visual content differs from the original visual content. For example, assessment of stabilization of visual content based on a stabilization trajectory may provide information on how much a viewing window deviates from the center of the field of view of the original visual content and/or how much the visual content is rotated to stabilize the visual content.

In some implementations, assessment of stabilization of visual content may include determination of one or more values (e.g., stabilization metric value) to indicate, reflect, and/or define the assessment. The value(s) may be determined as quantitative and/or qualitative measurement of how well the visual content has been stabilized (e.g., measuring visual pleasantness of the stabilized visual content). For the assessment of stabilization of visual content may include determination of one or more of stabilization performance score, stabilization performance level, stabilization performance percentage, and/or other quantitative and/or qualitative measurement of stabilization performance.

Assessment of stabilization of visual content based on a stabilization trajectory may enable differentiation of stabilization performance for similarly smooth stabilizations (e.g., stabilizations that result in similar average residual shakiness/changes in the stabilized trajectories). Assessment of stabilization of visual content based on a stabilization trajectory may enable differentiation of stabilization performance of a stabilization technique using different stabilization parameters.

In some implementation, assessment of stabilization of visual content based on a stabilization trajectory may utilize the relationship between the motion within the visual content and the length of the corresponding stabilization trajectory. For example, referring to FIG. 6, a shorter orientation path of the stabilization trajectories 602, 604 may correspond to steadier motion and/or better usage of the stabilization margin.

For example, assessment of stabilization of visual content may include determination a stabilization performance score (L) based on the stabilization trajectory and/or other information. For stabilization performance score determination, the following notation may be used to represent image capture device orientation at video frame i=1, . . . , N:

$$\vec{x}_i = (x_i, y_i, z_i)$$

The orientation may be represented in axis-angle domain obtainable from rotation matrices (c.f., Rodrigues formula) as well as from any other ways to measure orientations (e.g., Euler angles, unit quaternions). Frame timestamps may be represented as the following:

$$\{t_i\}_{i=1}^{N}$$

A length score of the stabilization trajectory may be computed based on differences in position/orientation and differences in frame timestamps, such as given by:

$$L'(\vec{x}_1, \ldots, \vec{x}_N, t_1, \ldots, t_N) = \sum_{i=1}^{N-1} \sqrt{\|\vec{x}_{i+1} - \vec{x}_i\|^2 - (t_{i+1} - t_i)^2}$$

The above computation of the length score may depend on the progress length/capture duration of the visual content (requiring equalization to enable comparison between stabilization of different visual content), as well as theoretical minimum corresponding to perfectly steady visual content. The above dependencies may be removed from the stabilization performance score (L) by subtracting the progress length/capture duration of the visual content (e.g., the video duration) from the length score:

$$L(\vec{x}_1, \ldots, \vec{x}_N, t_1, \ldots, t_N) = L'(\vec{x}_1, \ldots, \vec{x}_N, t_1, \ldots, t_N) - (t_N - T_1)$$

In some implementations, the stabilization performance score may be computed in an axis-wise fashion to assess the motion around individual axis separately.

The above computation of the stabilization performance score (L) may have the following properties. No motion may result in stabilization performance score of zero. Stabilization performance score for visual content of different progress length/capture duration may be comparable as if the shorter/shortest visual content were padded by keeping the last video frame orientation to reach the progress length of the longer/longest visual content. The stabilization performance score may be invariant to motion translations in time. For example, the stabilization performance score may be insensitive to different lengths of stabilized visual content. The stabilization performance score may be robust to no motion phases and the beginning and/or the end of the progress length/capture duration (incentive to static phases at the beginning and/or the end).

The stabilization performance score may depend on the crop motion/visual content rotation, but may not depend on intrinsic parameters of the image capture device. This enables objective comparison of stabilization performed on visual content captured by different image capture devices. The stabilization performance score may be used to compare stabilization performance of stabilization of different visual content captured by different image capture devices. Due to translation invariance, the comparison of the stabilization performance of stabilization of different visual content captured by different image capture device may not need synchronization among the image capture devices.

The change component 108 may be configured to effectuate one or more changes in stabilization for the visual content based on assessment of one or more stabilizations of the visual content and/or other information. For example, the change component 108 may be configured to effectuate one or more changes in stabilization for the visual content based on the stabilization performance score(s) and/or other assessments of the stabilization(s) of the visual content. Effectuating a change in the stabilization for the visual content may include automatically changing the stabilization for the visual content based on the assessment of the stabilization(s), providing one or more options to a user to change the stabilization for the visual content based on the assessment of the stabilization(s), and/or other changing of the stabilization for the visual content.

A change in stabilization for the visual content may include one or more of change in one or more stabilization techniques used to stabilize the visual content (e.g., change in which stabilization technique is applied to the visual content), change in one or more stabilization parameters for the stabilization technique(s) applied to the visual content (e.g., change in how the stabilization technique is applied to the visual content), and/or other changes in stabilization for the visual content. Such changes in stabilization of the visual content may allow assessment of the stabilization(s) to be used to benchmark/compare different stabilizations and/or analyze different stabilization parameters of stabilization techniques (e.g., during prototyping, integrating, and/or setting up visual content stabilization).

A stabilization technique may refer to one or more ways and/or methods for performing stabilization of visual content. A stabilization technique may stabilize visual content via use of one or more viewing windows/punchouts, modifications of the visual content (e.g., rotations, warping), and/or other ways/methods. Different stabilization techniques may stabilize visual content differently. Use of different stabilization techniques on visual content may result in different stabilized visual content. A stabilization technique may be defined and/or controlled by one or more stabilization parameters. A stabilization parameter may refer to a condition and/or a factor that defines and/or sets the conditions for stabilizing the visual content. A change in a stabilization parameter may entirely change the stabilization of the visual content and/or change one or more portions of the stabilization of the visual content.

For example, a stabilization parameter may include condition(s) and/or factor(s) that define how the viewing window/punchout of the visual content is determined, how the visual content is modified, and/or how the stabilization and/or stabilized trajectories are generated. For example, a change in the stabilization parameter may include a change in the viewing window. A change in the viewing window may include a change in a size, a shape, and/or other characteristics of the viewing window. For instance, the size of the viewing window may be decreased to increase the stabilization margin. The change in the size of the viewing window may simulate change in zoom in the stabilized visual content. The shape of the viewing window may be changed (e.g., from a wide viewing window providing a wide field of view punchout of the visual content to a linear viewing window providing a linear field of view punchout of the visual content) to increase the stabilization margin. The change in the shape of the viewing window may simulate a change in projection (e.g., from a wide-field of view projection to a rectilinear projection) in the stabilized visual content.

A change in the stabilization for the visual content may include a change in the stabilization trajectory generation and/or stabilized trajectory generation. For example, a change in the trajectory generation may include a change in a filter/smoothing factor used to smooth the observed trajectory into the stabilized trajectory, a filter width for the filter/smoothing factor, and/or other settings for the trajectory generation. For instance, different filters/smoothing factors and/or filter width may be used to generate different stabilization/stabilized trajectories with different curvatures. Different filters/smoothing factors and/or filter width may be used to change how closely the stabilized trajectory follows the observed trajectory or how much the stabilized trajectory deviates from the observed trajectory. For instance, use of smaller filter width may result in generation of stabilized trajectory that more closely follows the observed trajectory, which may reduce the number of stabilization constraint violation. Use of larger filter width may result in generation of stabilized trajectory that deviates more from the observed trajectory. Other changes in the stabilization for the visual content are contemplated.

In some implementations, assessment of stabilization and change in stabilization for the visual content may be repeated to identify/select one or more stabilization techniques and/or one or more stabilization parameters to stabilize the visual content. For example, assessment of stabilization and change in stabilization for the visual content may be performed to tune the stabilization parameters of one or more stabilization techniques. Best/highest performing stabilization technique/stabilization parameters (stabilization technique/stabilization parameters resulting in best/smallest stabilization performance score) may be identified/selected to stabilize the visual content. In some implementations, separate identification/selection of the best/highest performing stabilization techniques may be performed for different capture scenarios. For instance, example, best/highest performing stabilization technique/stabilization parameters may be separately identified/selected for different motions of the image capture device (e.g., different stabilization technique/stabilization parameters identification/selection for visual content captured while walking versus running versus flying).

The comparison component 110 may be configured to provide one or more comparisons of assessment of different stabilizations of the visual content. A comparison of assessment of different stabilization may include identification and/or analysis of difference in assessments of different stabilizations (e.g., difference in stabilization performance scores), presentation of assessments of different stabilizations (e.g., presentation of stabilization performance scores), and/or other comparison of assessments of different stabilizations. A comparison of assessment of different stabilizations of the visual content may be used to identify/select one or more stabilization techniques (stabilization selection) and/or one or more stabilization parameters (stabilization tuning) to stabilize the visual content. A comparison of assessment of different stabilizations of the visual content may be used benchmark different stabilizations (e.g., different stabilization techniques, different stabilization parameters).

For example, the comparison component 110 may provide a comparison of assessment of stabilization of the visual content performed using the stabilization trajectory A 602 with assessment of the different stabilization of the visual content performed using the stabilization trajectory B 604, and/or assessment(s) of other stabilization(s) of the visual content. The stabilization trajectories 602, 604 may reflect stabilization rotational positions as the function of progress through the progress length/capture duration for the stabilization of the visual content. At least some of the stabilization rotational positions of the stabilization trajectories 602, 604 may be different. That is, the stabilization trajectories 602, 604 may trace different paths and/or progressions of stabilization positions (e.g., different offsets for stabilization).

The assessment of the stabilization using the stabilization trajectory A 602 may be performed based on the stabilization trajectory length of the stabilization trajectory A 602 and/or other information, and the assessment of the stabilization using the stabilization trajectory B 604 may be performed based on the stabilization trajectory length of the stabilization trajectory B 604 and/or other information. Comparison of the stabilization of the visual content performed using the stabilization trajectory A 602 with assessment of the different stabilization of the visual content performed using the stabilization trajectory B 604 may include identification and/or analysis of difference in assessments of the stabilizations (e.g., difference in stabilization performance scores), presentation of assessments of the stabilizations (e.g., presentation of stabilization performance scores), and/or other comparison of assessments of different stabilizations. In some implementations, a comparison of assessment of one or more stabilizations may be made with respect to one or more standards and/or one or more benchmarks.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
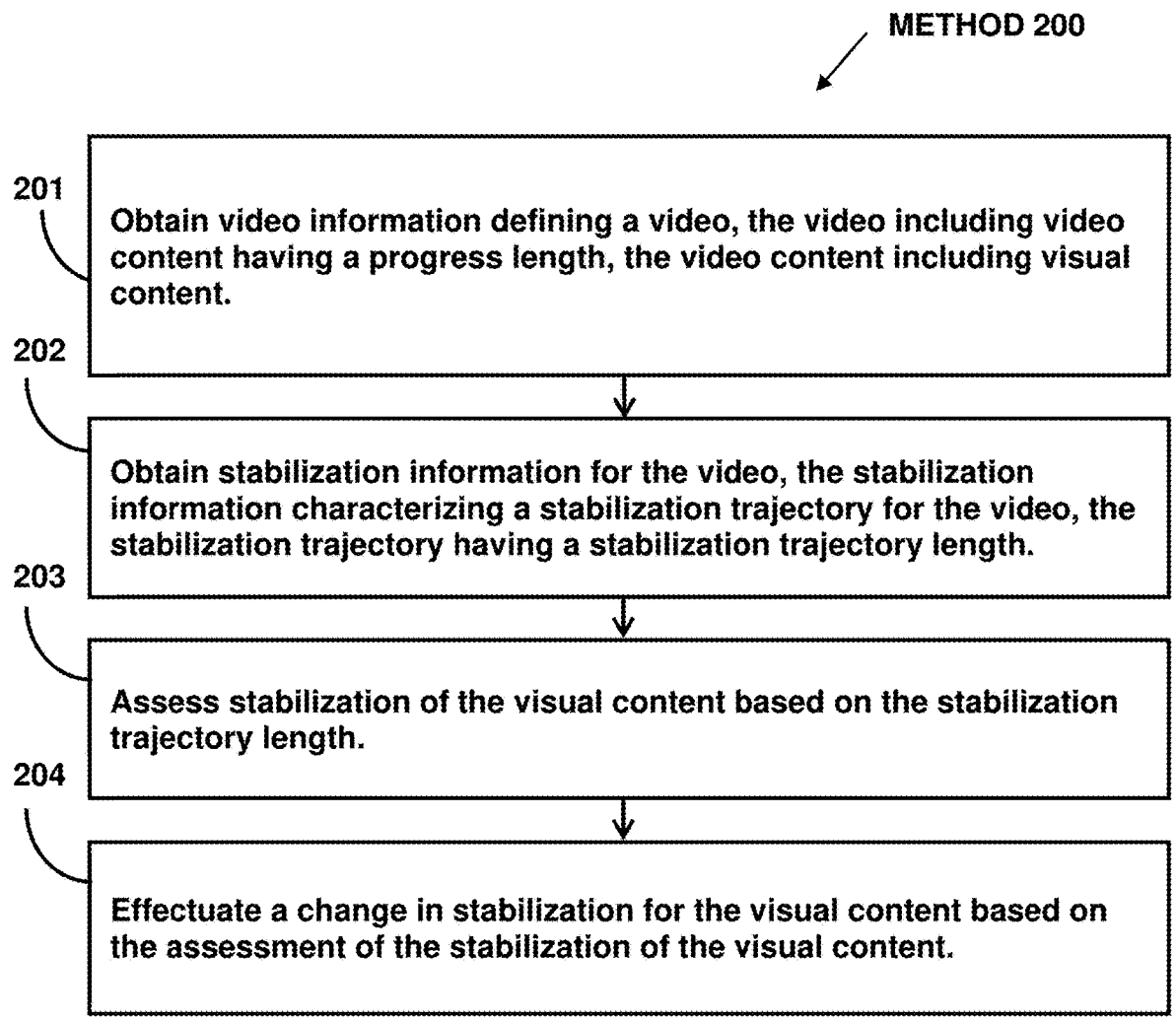
FIG. 2 illustrates an example method for assessing stabilization of videos.

FIG. 2 illustrates method 200 for assessing stabilization of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may include video content having a progress length. The video content may include visual content captured by an image capture device during a capture duration. The image capture device may experience rotational positions as a function of progress through the capture duration. In some implementation, operation 201 may be performed by a processor component the same as or similar to the video information component 102 (Shown in FIG. 1 and described herein).

At operation 202, stabilization information for the video may be obtained. The stabilization information may characterize a stabilization trajectory for the video. The stabilization trajectory may reflect stabilization rotational positions as the function of progress through the capture duration for stabilization of the visual content. The stabilization rotational positions may compensate for at least some of the rotational positions experienced by the image capture device. The stabilization trajectory may have a stabilization trajectory length. In some implementation, operation 202 may be performed by a processor component the same as or similar to the stabilization information component 104 (Shown in FIG. 1 and described herein).

At operation 203, the stabilization of the visual content may be assessed based on the stabilization trajectory length and/or other information. In some implementation, operation 203 may be performed by a processor component the same as or similar to the stabilization assessment component 106 (Shown in FIG. 1 and described herein).

At operation 204, a change in stabilization for the visual content may be effectuated based on the assessment of the stabilization of the visual content and/or other information. In some implementation, operation 204 may be performed by a processor component the same as or similar to the change component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for assessing stabilization of videos, the system comprising:
   one or more physical processors configured by machine-readable instructions to:
   obtain video information defining a video, the video including video content having a progress length, the video content including visual content captured by an image capture device during a capture duration, wherein the image capture device experiences rotational positions as a function of progress through the capture duration;
   obtain first stabilization information for the video, the first stabilization information characterizing a first stabilization trajectory for the video, the first stabilization trajectory reflecting first stabilization rotational positions as the function of progress through the capture duration for first stabilization of the visual content, the first stabilization rotational positions compensating for at least some of the rotational positions experienced by the image capture device, the first stabilization trajectory having a first stabilization trajectory length;
   assess the first stabilization of the visual content based on the first stabilization trajectory length;
   effectuate a change in stabilization for the visual content based on the assessment of the first stabilization of the visual content; and
   provide a comparison of the assessment of the first stabilization of the visual content with an assessment of a second stabilization of the visual content, wherein the assessment of the second stabilization of the visual content is performed based on a second stabilization trajectory length of a second stabilization trajectory for the video, the second stabilization trajectory reflecting second stabilization rotational positions as the function of progress through the capture duration for the second stabilization of the visual content, wherein at least some of the second stabilization rotational positions of the second stabilization trajectory are different from corresponding first stabilization rotational positions of the first stabilization trajectory.

2. The system of claim 1, wherein the change in stabilization for the visual content includes a change in one or more stabilization parameters.

3. The system of claim 1, wherein the first stabilization trajectory is determined based on a first stabilization technique and the second stabilization trajectory is determined based on a second stabilization technique different from the first stabilization technique.

4. The system of claim 1, wherein the first stabilization trajectory is determined based on a first set of stabilization parameters for a stabilization technique and the second stabilization trajectory is determined based on a second set of stabilization parameters for the stabilization technique, the first set of stabilization parameters different from the second set of stabilization parameters.

5. The system of claim 4, wherein the first set of stabilization parameters being different from the second set of stabilization parameters includes one or more values of the first set of stabilization parameters being different from one or more corresponding values of the second set of stabilization parameters.

6. The system of claim 4, wherein the first set of stabilization parameters being different from the second set of stabilization parameters includes the first set of stabilization parameters including one or more stabilization parameters not included in the second set of stabilization parameters.

7. The system of claim 4, wherein the first set of stabilization parameters being different from the second set of stabilization parameters includes the first set of stabilization parameters defining a first viewing window and the second set of stabilization parameters defining a second viewing window different from the first viewing window, the first viewing window defining a first extent of the visual content included within a first punchout and the second viewing window defining a second extent of the visual content included within a second punchout.

8. The system of claim 7, wherein the first viewing window being different from the second viewing window includes the first viewing window and the second viewing window having different sizes and/or shapes.

9. A method for assessing stabilization of videos, the method performed by a computing system including one or more processors, the method comprising:
   obtaining, by the computing system, video information defining a video, the video including video content having a progress length, the video content including visual content captured by an image capture device during a capture duration, wherein the image capture device experiences rotational positions as a function of progress through the capture duration;
   obtaining, by the computing system, first stabilization information for the video, the first stabilization information characterizing a first stabilization trajectory for the video, the first stabilization trajectory reflecting first stabilization rotational positions as the function of progress through the capture duration for first stabilization of the visual content, the first stabilization rotational positions compensating for at least some of the rotational positions experienced by the image capture device, the first stabilization trajectory having a first stabilization trajectory length;

assessing, by the computing system, the first stabilization of the visual content based on the first stabilization trajectory length;

effectuating, by the computing system, a change in stabilization for the visual content based on the assessment of the first stabilization of the visual content; and providing, by the computing system, a comparison of the assessment of the first stabilization of the visual content with an assessment of a second stabilization of the visual content, wherein the assessment of the second stabilization of the visual content is performed based on a second stabilization trajectory length of a second stabilization trajectory for the video, the second stabilization trajectory reflecting second stabilization rotational positions as the function of progress through the capture duration for the second stabilization of the visual content, wherein at least some of the second stabilization rotational positions of the second stabilization trajectory are different from corresponding first stabilization rotational positions of the first stabilization trajectory.

10. The method of claim 9, wherein the change in stabilization for the visual content includes a change in one or more stabilization parameters.

11. The method of claim 9, wherein the first stabilization trajectory is determined based on a first stabilization technique and the second stabilization trajectory is determined based on a second stabilization technique different from the first stabilization technique.

12. The method of claim 9, wherein the first stabilization trajectory is determined based on a first set of stabilization parameters for a stabilization technique and the second stabilization trajectory is determined based on a second set of stabilization parameters for the stabilization technique, the first set of stabilization parameters different from the second set of stabilization parameters.

13. The method of claim 12, wherein the first set of stabilization parameters being different from the second set of stabilization parameters includes one or more values of the first set of stabilization parameters being different from one or more corresponding values of the second set of stabilization parameters.

14. The method of claim 12, wherein the first set of stabilization parameters being different from the second set of stabilization parameters includes the first set of stabilization parameters including one or more stabilization parameters not included in the second set of stabilization parameters.

15. The method of claim 12, wherein the first set of stabilization parameters being different from the second set of stabilization parameters includes the first set of stabilization parameters defining a first viewing window and the second set of stabilization parameters defining a second viewing window different from the first viewing window, the first viewing window defining a first extent of the visual content included within a first punchout and the second viewing window defining a second extent of the visual content included within a second punchout.

16. The method of claim 15, wherein the first viewing window being different from the second viewing window includes the first viewing window and the second viewing window having different sizes and/or shapes.

17. A system for assessing stabilization of videos, the system comprising:
one or more physical processors configured by machine-readable instructions to:
obtain video information defining a video, the video including video content having a progress length, the video content including visual content captured by an image capture device during a capture duration, wherein the image capture device experiences rotational positions as a function of progress through the capture duration;

obtain first stabilization information for the video, the first stabilization information characterizing a first stabilization trajectory for the video, the first stabilization trajectory reflecting first stabilization rotational positions as the function of progress through the capture duration for first stabilization of the visual content, the first stabilization rotational positions compensating for at least some of the rotational positions experienced by the image capture device, the first stabilization trajectory having a first stabilization trajectory length;

assess the first stabilization of the visual content based on the first stabilization trajectory length;

effectuate a change in stabilization for the visual content based on the assessment of the first stabilization of the visual content, wherein the change in stabilization for the visual content includes a change in one or more stabilization parameters; and provide a comparison of the assessment of the first stabilization of the visual content with an assessment of a second stabilization of the visual content, wherein the assessment of the second stabilization of the visual content is performed based on a second stabilization trajectory length of a second stabilization trajectory for the video, the second stabilization trajectory reflecting second stabilization rotational positions as the function of progress through the capture duration for the second stabilization of the visual content, wherein at least some of the second stabilization rotational positions of the second stabilization trajectory are different from corresponding first stabilization rotational positions of the first stabilization trajectory, wherein the first stabilization trajectory is determined based on a first set of stabilization parameters for a stabilization technique and the second stabilization trajectory is determined based on a second set of stabilization parameters for the stabilization technique, the first set of stabilization parameters different from the second set of stabilization parameters.

18. The system of claim 17, wherein the first set of stabilization parameters being different from the second set of stabilization parameters includes one or more values of the first set of stabilization parameters being different from one or more corresponding values of the second set of stabilization parameters.

19. The system of claim 17, wherein the first set of stabilization parameters being different from the second set of stabilization parameters includes the first set of stabilization parameters including one or more stabilization parameters not included in the second set of stabilization parameters.

20. The system of claim 17, wherein the first set of stabilization parameters being different from the second set of stabilization parameters includes the first set of stabilization parameters defining a first viewing window and the second set of stabilization parameters defining a second viewing window different from the first viewing window, the first viewing window being different from the second viewing window includes the first viewing window and the second viewing window having different sizes and/or shapes, the first viewing window defining a first extent of the visual content included within a first punchout and the second viewing window defining a second extent of the visual content included within a second punchout.

* * * * *